United States Patent [19]

Harpster

[11] Patent Number: 4,949,578
[45] Date of Patent: Aug. 21, 1990

[54] FLOW METERING OF HIGH TEMPERATURE GASES

[76] Inventor: Joseph W. C. Harpster, 11450 Overbrook La., Galena, Ohio 43021

[21] Appl. No.: 255,842

[22] Filed: Oct. 11, 1988

[51] Int. Cl.⁵ .......................... G01F 1/68; G01F 5/00
[52] U.S. Cl. ................................. 73/202.5; 73/204.22
[58] Field of Search ............. 73/202.5, 204.11, 204.16, 73/204.22, 204.25

[56] References Cited

U.S. PATENT DOCUMENTS 2,813,237  11/1957  Fluegel et al. .................. 73/204.15
4,399,697  8/1983  Kohama et al. .................. 73/204.16

*Primary Examiner*—Herbert Goldstein
*Attorney, Agent, or Firm*—Mueller and Smith

[57] ABSTRACT

A flow meter capable of performing within gas flows exhibiting temperatures above about 600° F. includes a thermally-stable housing formed of fire brick or the like through which a passageway is formed. A resistance temperature sensor (RTD), serving as a reference is positioned at the entrance region of the passageway, while a heater coil and RTD temperature sensor are located toward the exit opening of the passage. The latter components are located within a heat confining region of the passageway which is so configured with respect to its length and diametric extent as to define a heat confining chamber which substantially reduces radiant heat loss, conductive heat loss, and convective heat loss not occasioned by gas flow to achieve heretofore unavailable performance.

20 Claims, 3 Drawing Sheets

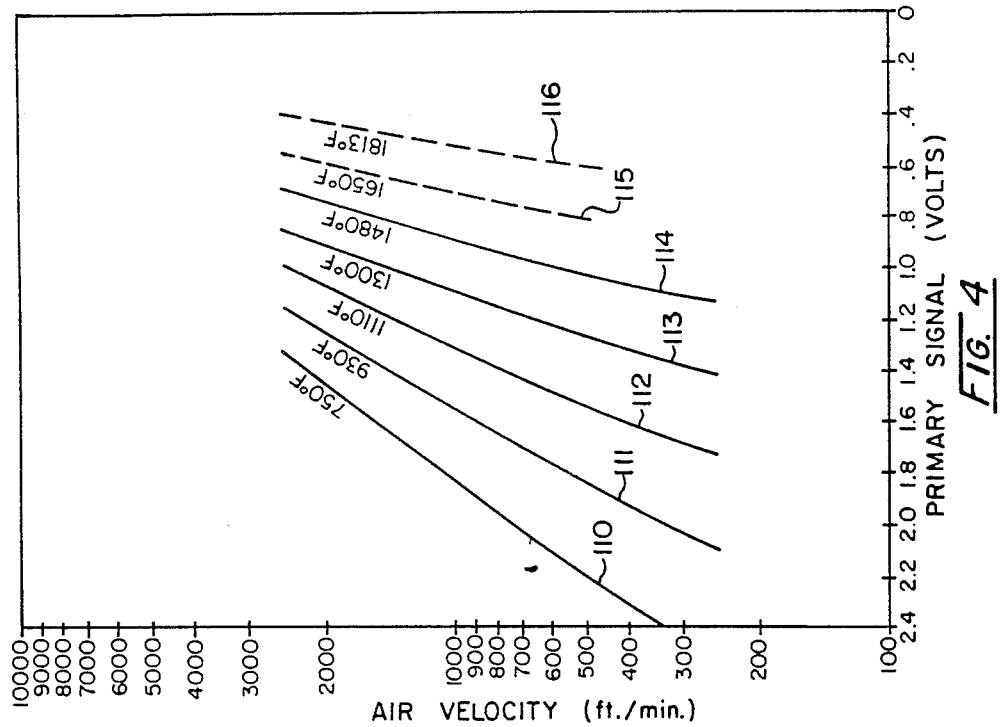
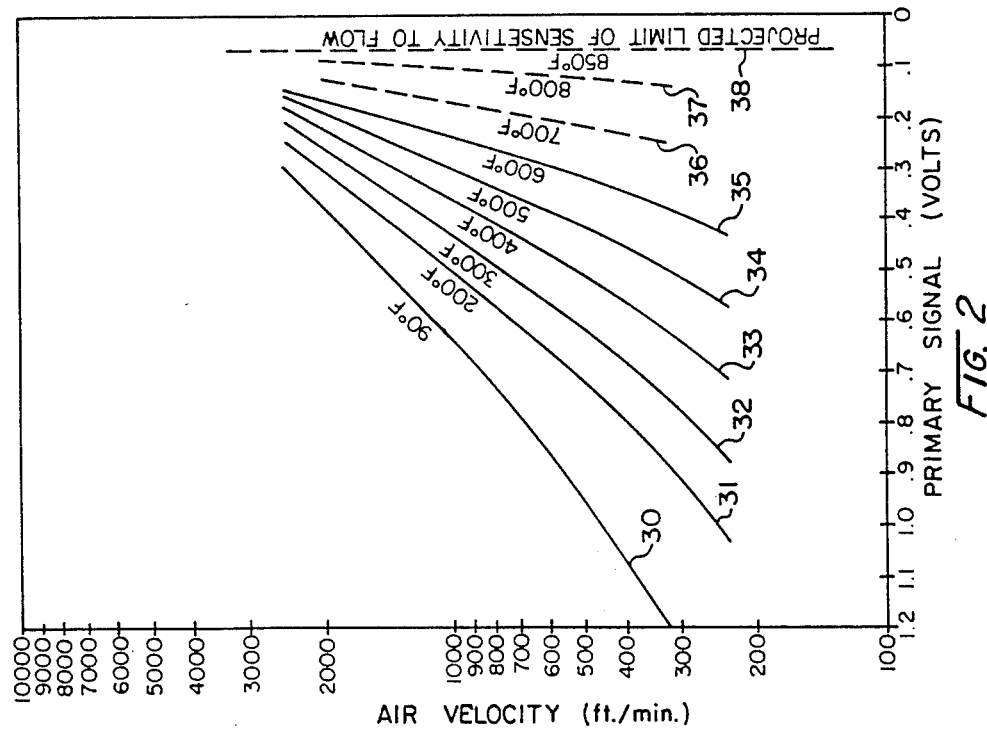

FLOW METERING OF HIGH TEMPERATURE GASES

BACKGROUND OF THE INVENTION

Systems for carrying out the combustion of material are employed by numerous industrial entities, ranging from those engaged in chemical production to power generating plants. As concern has intensified over the discharge of combustion products into the atmosphere, techniques have been sought for effectively monitoring combustion processes. By monitoring process parameters such as combustion air, fuel, and exhaust gases, higher combustion efficiencies can be developed, for example by optimizing fuel-to-air ratios.

An increasingly important aspect for combustion monitoring concerns mass balance analysis, where the mass transport of gas, fuel and other materials entering combustion and exiting therefrom as stack gas is evaluated. Such evaluations are required, for example, in the burning off or combustion of dangerous chemicals. For many applications, the gases being monitored are at quite high temperatures at each side of the combustion region. Combustion input air may be pre-heated to reach temperatures up to about 800° F., while exhausting stack gas may reach temperatures extending above 1500° F.

Monitoring procedures typically rely upon the positioning of relatively small flow meter probes within the gas stream. These instruments, while measuring a local velocity vector of the moving gas, can be calibrated to measure mass transport. One particularly accurate metering technique employs an arrangement wherein a reference temperature measuring probe is associated with a locally heated temperature measuring probe and the conductance of heat from the latter due to gas movement is converted to a velocity readout. Temperature sensing probes used for such purposes may, for example, be resistant temperature devices (RTD) formed of platinum materials or the like. Generally, such RTD devices, when tested under static conditions, will provide accurate temperature evaluations up to about 1600° F. It has been found, however, that such conventional flow meter probes exhibit signal loss when called upon to monitor velocity components of gases at temperatures above about 800° F. Thus, a need has arisen for a flow meter device capable of measuring gas flow at elevated temperatures.

SUMMARY

The present invention is addressed to apparatus and method for measuring the flow of high temperature gases. A desirable sensing technique heretofore employed with lower temperature materials is utilized wherein a heater is provided to heat one temperature sensor or probe to provide one signal or data input, while a second temperature sensor is located in thermal isolation from the first to provide a reference signal. These signals are treated to develop velocity related data. To achieve performance at higher temperatures, the heater and associated heated sensor are located within a heat confining cavity which is structured to permit passage of an elevated fluid component while substantially reducing radiant heat loss, conductive heat loss, and convection heat loss from the heater-sensor combination.

Another feature of the invention is the provision of apparatus for measuring the flow of gas of temperature above 600° F. which includes a housing formed of material remaining structurally stable at temperatures at least as high as 1500° F., having a gas flow passageway extending therethrough along an axis thereof and extending from an entrance opening to an exit opening. The passageway is formed having a heat confining cavity region of predetermined cross-sectional dimension and length extending inwardly from the exit opening. The passage further includes a reference region extending inwardly from the entrance opening and spaced from the heat confining cavity region at a distance substantially effecting a thermal isolation therefrom. The housing is positionable to locate the entrance opening to confront the gas flow to provide for passage of a local component of the gas through the passageway. A first temperature sensor is mounted within the heat confining cavity and includes first thermally stable leads extending therefrom for providing signals corresponding with the temperature thereof. A heater assemblage is mounted within the heat confining cavity adjacent the first temperature sensor for elevating the temperature thereof above the given temperature and having thermally stable power input leads extending from the housing. The heater assembly is positioned within the cavity and the cavity's cross-sectional dimension is selected for effecting a transfer, by radiation, of heat derived from the heater assemblage and transferred to the surface of the passageway, into the heat confining cavity region, and to the first temperature sensor and to substantially reduce radiant heat loss, conductive heat loss, and convective heat loss other than by the passage thereover of the gas. A reference temperature sensor is mounted within the reference region and includes thermally-stable leads extending from a housing for providing reference signals corresponding with the gas passing thereover.

Another feature of the invention provides a method for measuring the flow of gases where the temperature is above 600° F. which comprises the steps of:

providing a flow meter housing formed of material remaining structurally stable at the noted temperatures and having a passageway with a surface extending therethrough from an entrance opening to an exit opening;

positioning the housing entrance opening to confront the fluid flow to effect passage of a component of the flow through the passageway;

positioning a reference temperature sensor within a reference region of the passageway extending inwardly from the entrance opening to provide a temperature reference signal;

positioning a heater within a heat confining region of the passageway extending inwardly from the exit opening and spaced from the reference temperature sensor a distance selected to avoid thermal influence thereon by said heater;

positioning a heat region temperature sensor within said heat confining region;

configuring the heat confining region to have a length and diametric extent to effect a transfer, by radiation, of heat derived from said heater and transferred to said surface of said passageway, into said heat confining region, and to said heat region temperature sensor to substantially reduce radiant heat loss, conductive heat loss, and convective heat loss from the heater;

positioning a heat region temperature sensor within the heat confining region heating said heat confining region and said heat region temperature sensor by said heater to a temperature approaching thermal equilibrium therebetween and above the temperature of said gases to provide a flow responsive signal representing the temperature of the said heat confining region, said heater and said heat region temperature sensor; and treating the flow responsive signal and the reference signal to derive an output corresponding with the difference therebetween which is substantially proportional to the logarithm of the rate of flow of the gas components.

Other objects of the invention will, in part, be obvious and will, in part, appear hereinafter.

The invention, accordingly, comprises the method and apparatus possessing the design, construction, steps, and arrangement of components which are exemplified in the following detailed disclosure. For a fuller understanding of the nature and objects of the invention, reference should be made to the following detailed description taken in connection with the accompanying drawings.

BRIEF DESCRIPTION OF THE DRAWINGS

FIG. 2 is a family of curves wherein air velocity is plotted with respect to flow meter output signal for a series of gas temperatures;

FIG. 4 is a family of curves plotting air velocity with respect to flow meter output for a sequence of gas temperatures employing the flow meter of the invention;

DETAILED DESCRIPTION OF THE INVENTION

Figure 1:
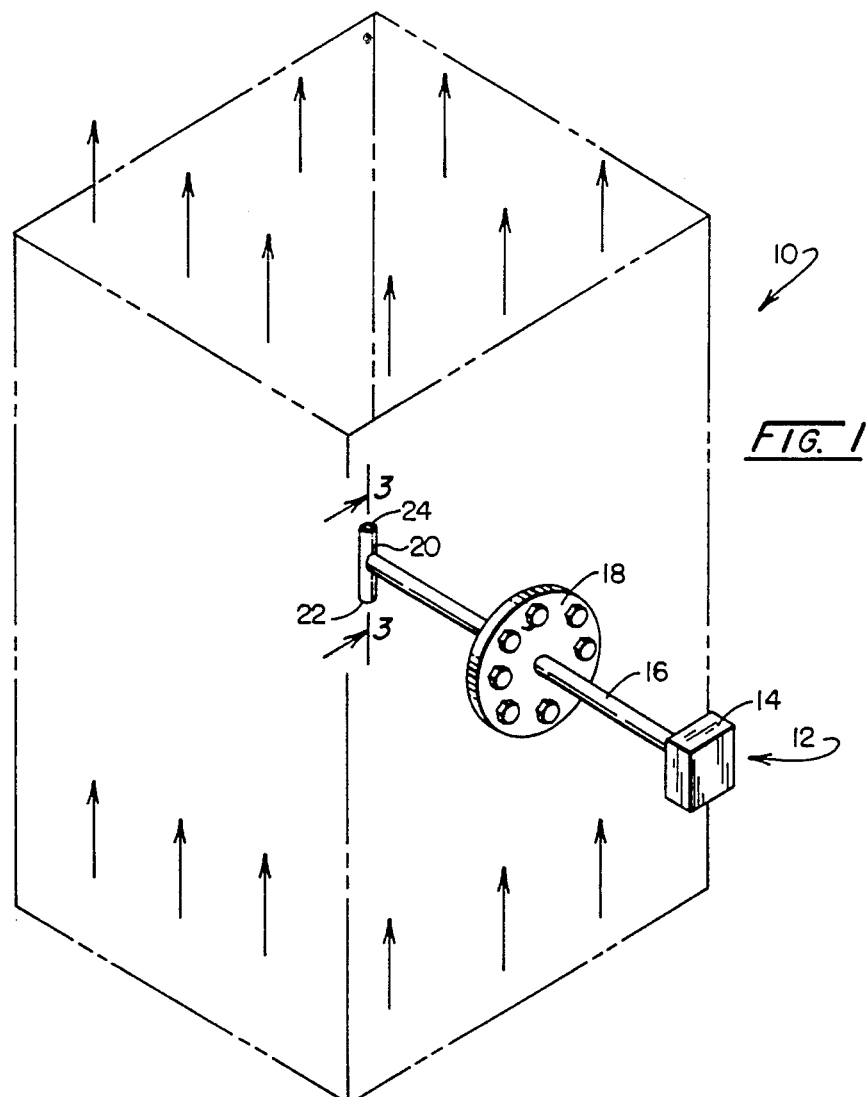
FIG. 1 is a schematic perspective view of a flow meter probe assembly according to the invention.

Referring to FIG. 1, a duct or stack region within which moving hot gas is to be evaluated is represented generally at 10. The movement of this gas is represented by the arrows within the duct 10 and an evaluation of velocity components of such movement is provided by a flow meter type probe represented generally at 12. The probe 12 includes a signal lead receiving block 14 which is coupled to a rod 16. Rod 16, in turn, is mounted for slidable movement within an access port cover 18 which is bolted at a predetermined location with respect to the duct region 10. Rod 16 is seen to extend and provide a support mount for a small cylindrical flow meter 20 having a passageway extending therethrough from an entrance opening 22 to an exit opening 24. Entrance opening 22 confronts a component of the gas flow within the region of fluid or gas movement.

A highly accurate apparatus to flow evaluation for such meters as at 20 is one which is described in U.S. Pat. No. 4,255,968 by Harpster which is incorporated herein by reference. The form of flow meter utilizing the approach may take a variety of configurations but will incorporate two temperature sensors and a heater. One heat region sensor is positioned to be heated within the passageway of the unit by the heater, while the other sensor is provided as a reference sensor which is remotely located within the passageway from the heating sensors. The heater and heated sensor are in thermal communication with the flowing gas and the conductance property or heat flow from the heated components increases as gas flow is increased, causing a lowering of temperature of both the heater and its immediate surroundings. A measure of the temperature differential between regions thermally remote from and near the heated components as developed between the two temperature sensor provides a calibratable signal, the value of which is in relationship to flow. For example, letting $\Delta T_0(v=0)$ represent the temperature differential between the heated and unheated temperature sensors for 0 stream velocity and letting $\Delta T_{(v)}$ be the temperature differential between the two sensors for stream velocity of v, then the difference between these two values, T, is relatable to flow through the relationship:

$$\Delta T = \Delta T_0(v=0)T(v) = C_1 Fctn(v)$$

where $C_1$ is an empirical constant.

Positioning a conventional flow meter operating under the technique as above described within a gas flow of increasingly higher gas temperatures will result in a loss of signal representing a form of saturation commencing at temperatures of about 600° F. This occurs even though the temperature sensors which may be employed, for example of an RDT variety, remain quite accurate when subjected to static testing at temperatures ranging as high as 1500° F. The testing of such a conventional and otherwise quite accurate flow meter is represented by the family of curves shown in FIG. 2.

For this test a tubular duct having an internal diameter of 3 inches and a length of 3 feet was provided. A standard, dual probe flow meter of the type then currently available and produced by Intek Inc. was positioned such that the probes extended within the duct at a location 3 feet from the eixt end thereof. A controllable air preheater was positioned at the entrance of the duct and a compressor was utilized as an air supply. A valve was employed for air flow control and such air flow was measured by variable area flow meter calibrated in standard cubic feet per minute (SCFM). This duct air velocity was determed by the measured SCFM divided by the duct cross-sectional area. Air flow was controllably varied from about 325 ft/min to about 2500 ft/min for a sequence of controlled temperatures ranging from 90° F. to 600° F. Curves 30 through 35 of FIG. 2 were developed from the resulting data.

Curves 30 through 35 show that the primary output signal in volts achieved with such a test arrangement provides a gradually sloping form of curve, the lower slopes being at lower temperatures as typified by curve 30 showing a 90° F. air temperature, and curve 31 showing the output response for gas flowing at 200° F. This form of output signal readily is converted to accurate velocity related information. However, as curve 34 representing gas temperature at 500° and curve 35 representing a gas temperature at 600° are observed, there is exhibited a steepness which limits the signal availability for providing air velocity data. In effect, the flow meter exhibits what may be termed a saturated response. Additional extrapolation of resultant signals for gas temperatures at 700° F. at curve 36 and 800° F. at curve 37 show that the curves will tend to become even steeper and that the velocity primary output signal will be unacceptable. An extrapolation essentially evidencing verticality occurs as represented at dashed curve 38 for a temperature of about 850° F.

Figure 3:
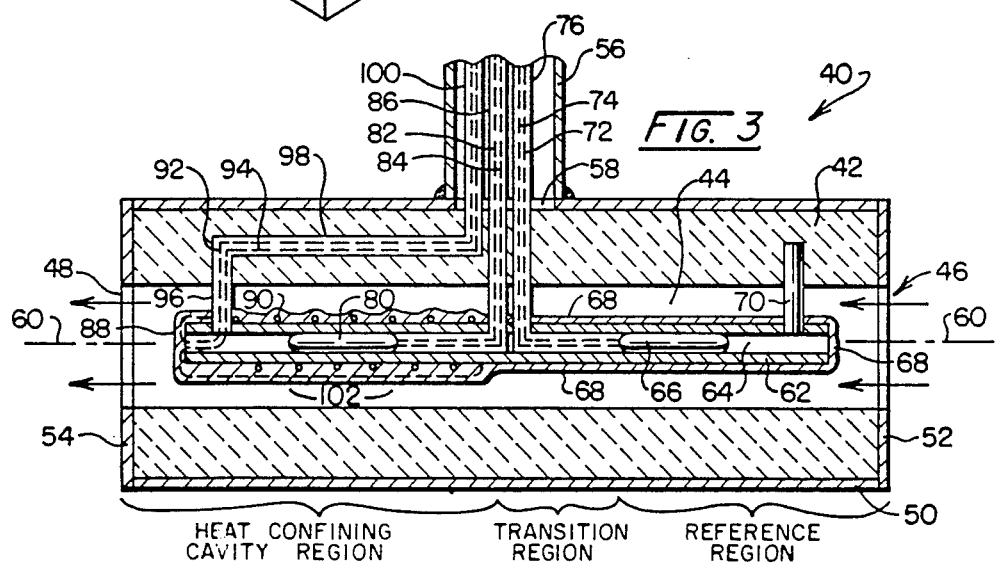
FIG. 3 is a sectional view of the flow meter shown in FIG. 1 taken through the plane 3—3 thereof.

Referring to FIG. 3, a configuration of a flow meter of the type employing a heated sensor element but enabling operation with gases at temperatures greater than about 600° F. and at least as high as about 1500° F. is represented in general at 40. Flow meter 40 includes a cylindrical head or housing 42 formed of a material remaining structurally stable and thermally insulating at temperatures as are contemplated, i.e. at least as high as 1500° F. One suitable material for this purpose is fire brick, a ceramic material formed from fire clay. Housing 42 is shown having a centrally disposed passageway 44 extending therethrough from an entrance opening 48. The flow meter 40 is positioned so that the entrance opening 46 confronts a component of gas flow such that it passes therethrough and out the exit opening 48. The velocity of this component is evaluated by the device. Housing 42 is of generally cylindrical configuration and is enclosed within a protective outer stainless steel shell including a cylindrical portion 50 and entrance and exit washer shaped components shown, respectively, at 52 and 54. Housing 42 is supported by a support mount provided, for example, as a stainless steel tube 56. Tube 56 is welded to the supporting shell 50 at an access opening formed therein as represented at 58.

Disposed generally about the central axis 60 of the cylindrical passageway 44 is a hollow, ceramic support tube 62 having an internally disposed passage 64 extending therethrough. Tube 62 extends within passageway 44 through a reference region as labeled at the upstream half of device 40 as well as through a transition region and then a heat confining cavity region, as labeled, the latter extending inwardly from the exit opening 48. Within the passage 64 portion of tube 62 located within the noted reference region, there is positioned a reference heat sensor 66 which may be provided, for example, as a resistance temperature device (RTD) formed of platinum. The upstream side of tube 62 is sealed with a ceramic cement represented at 68 and is supported by a ceramic rod 70 from the fire brick housing material 42.

Two nickel wire leads represented by dashed lines 72 and 74 extend from the sensor 66 through the passage 64 into a two-channel ceramic tube 76 having two passageways. Tube 76 extends into tube 62 and is cemeted thereto as well as fixed to the housing 42 to provide a centrally-disposed support for tube 62. The tube 76 then extends through the support mount 56 for bringing out the leads 72 and 74 to control circuitry.

The opposite or downstream side of tube 62 serves to protectively support a heat region temperature sensor 80. Sensor 80 is seen positioned within the passage 64 of tube 62 and is shown having two nickel leads represented by dashed line 82 and 84 extending through passageway 62 to another two-channel ceramic tube 86 which extends normally to tube 62, through housing 42 and into the support mount 56. As before, the leads 82 and 84 are directed to remotely located control circuitry. Tube 86 additionally functions as a support for the tube 62 and is coupled thereto by ceramic cement. Passage 64 extending on the opposite side of sensor 80 is sealed by ceramic cement represented at 88 which also serves to protect and stabilize a wire heater coil 90 which is wrapped about the external surface of tube 62 within the heat confining cavity region. Formed, for example, of nickel-chrome alloy wire, the coil 90 is shown having power leads represented by dashed lines 92 and 94 extending therefrom, into passage 64 and through a two-channel ceramic tube 96 extending from the center of housing 42 and into tube 62. Thus, the tube 96 functions as a support at the exit side of tube 62. From tube 96, a second two-channel ceramic tube 98 communicates through housing 42 in parallel with axis 60 to a next two-channel ceramic tube 100 extending from support mount 56.

In accordance with the invention, the diameter or cross-sectional dimension and length of passageway 44 within the heat confining region are selected to define a heat confining chamber which functions to substantially reduce radiant heat loss, conductive heat loss, and convective heat loss from the heater coil 90-sensor 80 combination as otherwise would occur in the absence of the internal surface of passageway 44 at the cavity region. At the temperatures normally encountered inside of a furnace or stack, without correction, radiant heat loss will be substantial with respect to the otherwise normal performance of the sensor 80 and heater coil 90. The flow evaluation device must be constructed so as to prohibit the heater as at 90 from "seeing" radiation energy from the walls of the furnace or stack and vice versa. With the flow measuring technique of the invention, the sensor 80 must be heated by the heater 90 and the latter heater must be prevented from dropping in temperature because of radiation coupling with the wall of the stack or furnace within which the device is located. Where such coupling occurs, the temperature differential between the heated probe 80 and the reference probe as at 66 drops substantially to create the conditions represented by the higher temperature curves of FIG. 2. The heaters employed with devices of the instant invention as at 90 are surrounded by the thermally stable material of passageway 44 which is insulative and arranged to define the noted heat confining cavity region which is dimensioned such that the majority of radiation emanating from the heater 80 is transferred to the internal surface of the cavity region, thus warming that region to a temperature essentially in equilibrium with the temperature of the heater 90 and sensor 80 itself. Thus developed, the heat confining cavity region itself is that element which changes temperature in response to alterations in the flow of gas which is being measured. Accordingly, a heat confining cavity region of cross-sectional dimension is selected for effecting a transfer, by radiation, of heat derived from the coil 90 and transferred to the surface of the passageway 44 heat confining cavity region as well as to the sensor 80.

Convective heat transfer is required to be accommodated for within such a structure in view of the highly turbulent hot air or gas within a furnace or hot stack. Passageway 44, which ultimately forms the heat confining cavity region, substantially reduces off-axis flow vectors of the gas representing lateral turbulence, therefore reducing convective heat transfer from the components within the heat confining cavity region. By so reducing the presence of such fluid flow vectors, fluid flow passage 44 will contain vectors which will be engaged both by sensor 66 as well as by the components of the heat confining cavity region to assure higher accuracies. This same uniformity of flow through the passageways as at 44 permits a conductive form of heat transfer between the reference sensor 66 and gas, as well as all components within the heat confining cavity region. With such improved conductive heat tranfer, there results a corresponding improvement in the capability of device 40 to measure flow. Additionally, the heated region must be remote or spaced from the reference sensor 66 so as to have insignificant thermal influence, thus, the labeled transition region is present. Where fire brick is used as the material for housing 42, its cavity surface is heated by coil 90 to an extent where, for use with high temperature gases, it becomes red hot to white hot and reradiates otherwise lost thermal energy back to the heater 90—sensor 80 combination. Under the condition of increasing gas flow, the temperature of the heater 90, the temperature sensor 80, and the cavity region walls of passageway 44 decrease. In effect, the wall of the cavity region or chamber tend to approach thermal equilibrium with the sensor 80 and heater 90. As an alternative, a metal material having a specularly reflective internal surface defining the het confining chamber may be employed. Generally, the length of the heat confining region should be at least five times its diametric extent to define an effective heat confining chamber which may be represented generally at 102.

Steps were carried out employing a flow meter as structured at 40 to determine its effectiveness in measuring the flow of gases at high temperatures. As a first step, the device 40 was placed within a large duct having a cross-sectional dimension of 10 in×12 in and a length of about 12 feet. The flow meter 40 was positioned about 4 feet from the exit end of the duct and a pitot tube was positioned adjacent to the flow meter to measure the duct air velocity. A speed controlled fan was positioned at the entrance to the duct. The output signal (volts) from the flow meter was recorded and represented a function of duct air velocity. This signal also represented the amount of air flowing through the sensor itself in cubic feet per minute which results from the sensor being located in a duct air stream of corresponding air velocity.

For the next step, the flow meter 40 was removed from the duct and placed within and in axial alignment with a split tube furnace produced by Lindberg Corp. At the entrance of this furnace there was closely coupled a Mullite tube air preheater having a heating capacity sufficient to heat incoming air to the temperatures established at the split tube furnace. An air compressor was provided as an air supply to the entrance of the preheater. The amount of air so supplied was controlled by a control valve and measured by a variable area flow meter. The air input was adjusted at room temperature corresponding with the duct temperature of step 1 to achieve a flow meter 40 output corresponding with the voltage signal data from step 1. A measurement of standard cubic feet (SCFM) per minute is relatable to this duct velocity and this relationship holds for all temperatures.

That SCFM information then was utilized in conjunction with air flow runs to obtain duct air velocity versus signal data of temperatures (preheater and furnace) over predetermined ranges. In this regard tests were carried out at gas temperatures of 750° F., 930° F., 1110° F., 1300° F., and 1470° F. for air velocities varying from about 250 feet per minute to 2500 feet per minute. The results are shown in curves 110-114 in FIG. 4. Note in FIG. 4 that curve 110 shows a fully suitable relatively low sloping curve output characteristic for a temperature of 750°, a temperature at which flow velocity variation yields almost no change in signal using prior techniques. Curve 111 representing a gas temperature of 830° F., curve 112 representing a gas temperature of 1110° F., curve 113 representing a gas temperature of 1300° F. and curve 114 representing a gas temperature of 1470° F. show slope characteristics which are usable in generating velocity character output singals. Dashed curves 115 and 116 represent an extrapolated characteristic curve for respective temperatures of 1650° F. and 1830° F. It is postulated that as these higher temperatures are encountered, the radiated heat loss effect at the heat confining cavity becomes more pronounced than the effects of convective heat loss and conductive heat loss.

Figure 5:
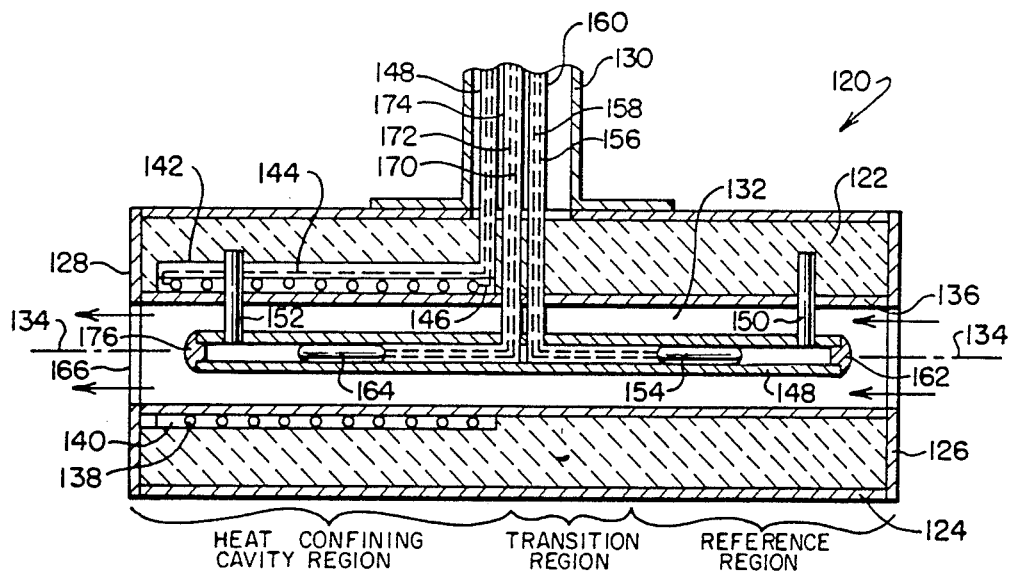
FIG. 5 is a sectional view of another embodiment of a flow meter according to the invention.

Referring to FIG. 5, another embodiment for the flow meter of the invention is revealed in general at 120. The flow meter 120 as before, includes a cylindrical housing 122 formed of a material remaining structurally stable and thermally insulating at the temperatures contemplated, for example, fire brick or like material formed from fire clay. Housing 122 is enclosed in a stainless steel shell assemblage including a cylindrical portion 124 cemented to housing 122 as well as washer-shaped entrance cover 126 and similarly configured exit cover 128. The latter covers are welded to cylindrical component 124. A stainless steel cylindrical rod or support mount 130 is welded to the cylindrical shell component 124 to position the device 120 as described in conjunction with FIG. 1 and carry electrical leads. A cylindrical passageway 132 extends through the housing 122 concentrically with the axis thereof 134 and this passageway is seen, as labeled, to be configured having a reference region, a transition region leading thence to a heat confining region extending to the exit opening 166 at component 128. The passageway, for the instant embodiment, includes a ceramic tube 136 formed, for example, of Mullite. Tube 136 is prewound at the defined heat confining cavity region with a coil of heater wire which, as before, may be nichrome as represented at 138. Wire 38 is cemented in place prior to the insertion of the tube 136. To facilitate positioning of the heater coil 138 as shown, on the tube 136, housing 122 may be counterbored as represented at 140. Further, a groove 142 is located in the upper portion of housing 122 adjacent the heater coil 138 to carry two thermally stable leads formed, for example, of nickel as shown by dashed lines 144 and 146. Leads 144 and 146 are encased with the coil 138 in a ceramic cement and extend to a dual channel ceramic tube 148 extending within the hollow portion of rod 130.

As in the embodiment of FIG. 3, the flow meter 120 includes a ceramic tube 148 mounted coaxially within the passageway 132, such mounting including a ceramic tube or extension 150 extending from housing 122 to tube 148 as well as a similar supporting tube 152. Each of the supports 150 and 152 are retained in position by a ceramic cement. A reference temperature sensor 154 is positioned within tube 148 at the reference region. Sensor 154 preferably is provided as a resistance temperature device (RTD) and is shown having two leads represented by dashed lines 156 and 158 formed, for example, off nickel which extends within tube 148 to a centrally intersecting dual channel ceramic tube 160. Tube 160 additionally functions to support the tube 148 at its mid position. At the reference region entrance area, it may be observed that tube 148 is capped by a button-type cap 162 which is cemented in place with ceramic cement.

That portion of tube 148 extending into the heat confining region is shown to carry a temperature sensor 146 which may be identical to that at 154 but which is located within a heat confining cavity defined by the heat confining cavity region wherein the length of the cavity and its diametric extent are selected to substantially reduce radiant heat loss, conductive heat loss, and convective heat loss. In this regard, however, inasmuch as the heater coils are at the periphery of this heat confining region, the reradiating phenomena of the embodiment of FIG. 3 is not encountered, a direct form of radiation and other thermal coupling into the sensor 164 being evolved. Generally, to achieve a heat confining chamber effect, the length of the heat confining region should be at least about five times the diametric extent of the chamber. This minimizes the solid angle "seen" by the sensor 164 as it extends to the entrance opening at 166 and as that angle "looks" at the entrance region of the device. Generally, the solid angle should be as narrow as practical. Thermally stable leads, for example formed of nickel as represented at dashed lines 170 and 172 are shown extending from sensor 164 toward the middle of the tube 148, thence into intersecting and supporting dual channel ceramic tube 174 extending, in turn, through the rod 130. A cap 176 serves to plug the tube 148 at the exit side of device 120.

Figure 6:
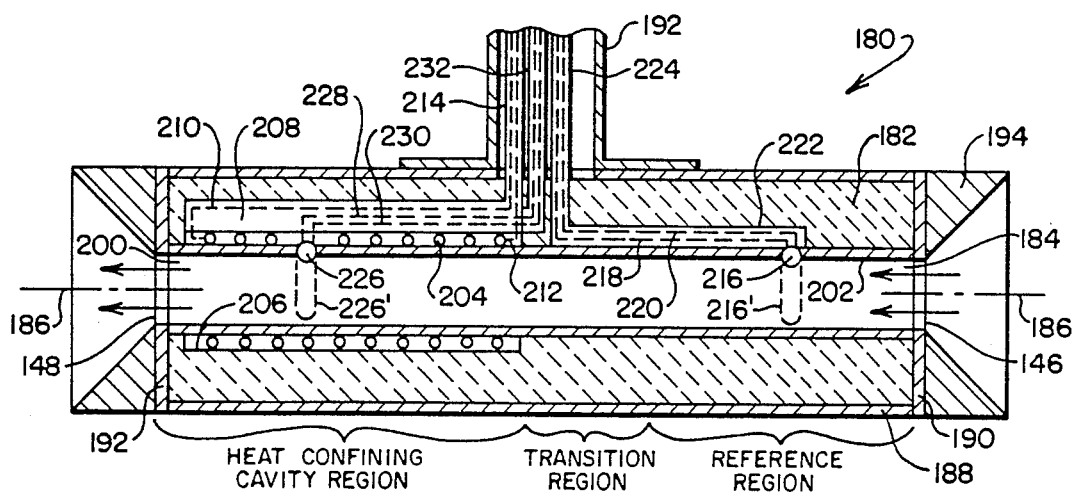
FIG. 6 is a sectional view of another embodiment of a flow meter structured in accordance with the teachings of the invention.

Referring to FIG. 6, still another embodiment of a flow meter according to the invention is revealed as a sectional view in general at 180. The flow meter 180, as before, includes a housing 182 which may be formed of a material remaining structurally stable at and thermally insulating the temperatures contemplated, for example fire brick. This housing is cylindrical and is provided with a cylindrical passageway 184 concentric with the axis 186 of the device. A stainless steel shell assembly including a cylindrical component 188 and washer shaped entrance component 190 and exit component 192 are coupled to the housing 182 by a ceramic cement and are mutually welded together. As before, a support mount or hollow rod 192 formed of stainless steel positions the flow meter 180 as illustrated earlier in connection with FIG. 1. For the instant embodiment, an entrance cone 194 formed of stainless steel or the like suitable for the temperature, is positioned at the entrance 196 of passageway 184. In similar fashion, an exit cone 198 is positioned at the exit 200 of the passageway 184. Cone 194 facilitates the entrance of gas into the passageway 184, while cone 198 serves to aid in minimizing turbulent flow of gases leaving the passageway 184 through exit 200.

Similar to the embodiment of FIG. 5, flow meter 180 includes a thermally-stable ceramic tube 202 formed of Mullite or the like which is cemented within housing 182. Tube 202, as before, includes a reference region, a transition region, and a heat confining cavity region as labeled in the Figure. Similar to the embodiment of FIG. 5, the tube is prewound with a nichrome wire heater coil which is attached thereto by ceramic cement and slides within a counterbore 206 formed within the cylindrical housing 182. A groove 208 formed within the upper wall of the housing 182 functions to carry nickel lead wires represented by dashed lines 210 and 212 to a dual channel ceramic tube 214 positioned within mount or rod 192.

For the instant embodiment, the reference temperature sensor within the reference region is provided as a transversely mounte resistance temperature device (RTD) 216 mounted using ceramic cement within a slot within tub 202. As before, the reference sensor 216 is positioned so as to remain substantially out of the thermal influence of heater 204 and is configured having two nickel leads 218 and 220 extending within a groove 222 leading, in turn, to two channel ceramic tube 224 extending within rod or support mount 192.

The thermal sensor within the heat confining region is similarly mounted. In this regard, a resistance temperature device (RTD) 226 is transversely mounted within a heat confining cavity at the labeled heat confining region. The two nickel leads of device 226 as represented by dashed lines 228 and 230 extend within groove 208 to a centrally-disposed dual channel ceramic tube 232 within support mount or rod 192. As before, the heater coils 204 and sensor 226 are positioned within the heat confining cavity region. The cavity is configured having a cross-sectional or diametric dimension at passageway 184 within the heat confining region selected to substantially reduce radiant heat loss, conductive heat loss and convective heat loss. The noted ratio of length to diameter of 5:1 again applies for the instant embodiment.

An alternative configuration for the mounting of sensors 216 and 226 is represented in phantom in the drawing and identified by primed numeration 216' and 226'. This radial orientation of the sensors provides for a more intimate association between the sensors and gases passing through the confining chamber at passageway 184 providing improved sensor response time. However, this form of mounting is more fragile than the transverse mounting shown in solid fashion.

The flow meter of the invention may be employed in conjunction with gas temperatures above the above-discussed 1500° F. values where temperature sensors of higher temperature ranges are available. For example, it is known that present platinum RTDs are not suitably applicable above 1562° F. High temperature thermocouples may therefore be used in place of RTD's. The approximate 5:1 ratio of the length of the heat confining cavity region to its diameter may not be suitable at higher temperatures due to an increase in cavity heat loss at the temperature increases. Still further other shapes of the entrance (194) and exit cones (198) of FIG. 6 such as having rounded edges or increasing leading edge diameter will change the sensitivity at the signal in a manner to improve the sensor's response.

Since certain changes may be made in the above-described apparatus and method without departing from the scope of the invention herein revealed, it is intended that all matter contained in the description thereof or shown in the accompanying drawings shall be interpreted as illustrative and not in a limiting sense.

I claim:

1. Apparatus for measuring the flow of gas of temperature above 600° F. comprising:

a housing formed of material which is structurally stable, thermally insulating, and having a gas flow passageway therethrough along an axis thereof extending from an entrance opening to an exit opening, having a surface representing a heat confining cavity region of predetermined cross-sectional dimension and length extending inwardly from said exit opening, said passageway having a reference region extending inwardly from said entrance opening and spaced from said heat confining cavity region a distance substantially effecting a thermal isolation therefrom, said housing being positionable to locate said entrance opening to confront said gas flow to provide for passage of a local component of said gas through said passageway;

first temperature sensor means mounted within said heat confining cavity region and including thermally stable first leads extending therefrom for providing signals corresponding with the temperature thereof;

heater means mounted within said heat confining cavity region adjacent said first temperature sensor means for elevating the temperature thereof above said gas temperature and having thermally stable power input leads extending from said housing, said heater means being positioned within said cavity region and said cavity region having a cross-sectional dimension effecting a transfer, by radiation, of heat derived from said heater means and transferred to the surface of said passageway, into said heat confining cavity region, and to said first temperature sensor means and effective to substantially reduce radiant heat loss, conductive heat loss and convective loss of heat generated thereby other than by the passage thereover of said gas; and second temperature sensor means mounted within said reference region and including thermally stable second leads extending from said housing for providing reference signals corresponding with said gas passing thereover.

2. The apparatus of claim 1 in which:
said housing material remains structurally stable at temperatures at least as high as 1500° F.; and
said first and second temperature sensor means are resistance temperature sensors.

3. The apparatus of claim 1 in which said passageway is provided having a surface which is specularly reflective and thermally stable at said given high temperature.

4. The apparatus of claim 1 including:
a thermally stable tube having an external surface adjacent said housing, a central axis substantially coaxial with said passageway axis and an internal surface defining said passageway; and
said first and second temperature sensing means are mounted at said tube internal surface transversely to said passageway axis.

5. The apparatus of claim 4 in which said heater means is formed as a thermally stable wire coil wound about said external surface of said thermally stable tube at said heat confining cavity region.

6. The apparatus of claim 1 including:
a thermally stable tube having an external surface adjacent said housing, a central axis substantially coaxial with said passageway axis, and an internal surface defining said passageway; and
said first and second temperature sensing means are mounted upon said housing to extend radially inwardly into said passageway.

7. The apparatus of claim 6 in which said heater means is formed as a thermally stable wire coil wound about said external surface of said thermally stable tube at said heat confining cavity region.

8. The method for measuring the flow of gases exhibiting temperatures above 600° F. comprising the steps of:
providing a flow meter housing formed of material remaining structurally stable and thermally insulating at said temperatures and having a passageway with a surface extending therethrough from an entrance opening to an exit opening;
positioning said housing entrance opening to confront said fluid flow to effect passage of a component of said flow through said passageway;

positioning a reference temperature sensor with a reference region of said passageway extending inwardly from said entrance opening to provide a temperature reference signal;
positioning a heater within a heat confining region of said passageway extending inwardly from said exit opening and spaced from said reference temperature sensor a distance selected to avoid a thermal influence thereon by said heater;
positioning a heat region temperature sensor within said heat confining region;
configuring said heat confining region to have a length and diametric extent to effect a transfer, by radiation, of heat derived from said heater and transferred to said surface of said passageway, into said heat confining region and to said heat region temperature sensor, to substantially reduce radiant heat loss, conductive transfer, and convective heat loss from said heater and cavity region other than by the passage thereover of said gases;
heating said heat confining region and said heat region temperature sensor by said heater to a temperature approaching thermal equilibrium therebetween and above the temperature of said gases to provide a flow responsive signal representing the temperature of the said heat confining region, said heater and said heat region temperature sensor; and
treating said flow responsive signal and said reference signal to derive an output corresponding with the difference therebetween which is substantially proportional to the logarithm of the rate of flow of said gas component.

9. The method of claim 8 in which said step configuring said heat confining region establishes a said length which is at least about five times said diametric extent.

10. The method of claim 8 in which said step providing a flow meter housing includes the step of forming said housing of fire brick.

11. The method of claim 8 in which said reference temperature sensor and said heat region temperature sensor are resistance temperature devices.

12. Apparatus for measuring the flow of gas of given high temperature comprising:
a housing formed of a fire brick, and having a gas flow passageway therethrough along an axis thereof extending from an entrance opening to an exit opening, having a heat confining cavity region of predetermined cross-sectional dimension and length extending inwardly from said exit opening, said passageway having a reference region extending inwardly from said entrance opening and spaced from said heat confining cavity region a distance substantially effecting a thermal isolation therefrom, said housing being positionable to locate said entrance opening to confront said gas flow to provide for passage of a local compartment of said gas through said passageway;
first temperature sensor means mounted within said heat confining cavity and including thermally stable first leads extending therefrom for providing signals corresponding with the temperature thereof;
heater means mounted within said heat confining cavity adjacent said first temperature sensor means for elevating the temperature thereof above said given temperature and having thermally stable power input leads extending from said housing, said heater means being positioned within said cavity and said cavity cross-sectional dimension being selected to substantially reduce radiant heat loss, conductive heat loss and convective loss of heat generated thereby; and second temperature sensor means mounted within said reference region and including thermally stable second leads extending from said housing for providing reference signals corresponding with said gas passing thereover.

13. The apparatus of claim 12 including:

support mount means coupled to said housing and having a first ceramic lead retainer extending to said support tube and communicating with said support tube passage for receiving said first leads, and a second ceramic lead retainer extending to said support tube and communicating with said support tube passage for receiving said second leads.

14. The apparatus of claim 12 in which said heater means is formed as a thermally-stable wire coil wound about the exterior of said support tube over said first temperature sensor means.

15. The apparatus of claim 14 including support mount means coupled to said housing and having a ceramic power lead retainer extending to said support tube for receiving sid power input leads.

16. Apparatus for measuring the flow of gas of given high temperature comprising:

a housing formed of material which is structurally stable thermally insulating, and having a gas flow passageway therethrough along an axis thereof extending from an entrance opening to an exit opening, having a heat confining cavity region of predetermined cross-sectional dimension and length extending inwardly from said exit opening, said passageway having a reference region extending inwardly from said entrance opening and spaced from said heat confining cavity region a distance substantially effecting a thermal isolation therefrom, said housing being positionable to locate said entrance opening to confront said gas flow to provide for passage of a local component of said gas through said passageway;

first temperature sensor means mounted within said heat confining cavity and including thermally stable first leads extending therefrom for providing signals corresponding with the temperature thereof;

heater means mounted within said heat confining cavity adjacent said first temperature sensor means for elevating the temperature thereof above said given temperature and having thermally stable power input leads extending from said housing, said heater means being positioned within said cavity and said cavity cross-sectional dimension being selected to substantially reduce radiant heat loss, conductive heat loss and convective loss of heat generated thereby;

second temperature sensor means mounted within said reference region and including thermally stable second leads extending from said housing for providing reference signals corresponding with said gas passing thereover;

a thermally-stable support tube extending within said passageway and having an internally disposed passage for retaining said first and second temperature sensor means in spaced relationship; and a ceramic seal for sealing said internally disposed passage.

17. Apparatus for measuring the flow of gas of given high temperature comprising:

a housing formed of material which is structurally stable thermally insulating, and having a gas flow passageway therethrough along an axis thereof extending from an entrance opening to an exit opening, having a heat confining cavity region of circular cross section of predetermined diameter and of predetermined length, said length being at least about five times greater than said predetermined diameter, said cavity region extending inwardly from said exit opening, said passageway having a reference region extending inwardly from said entrance opening and spaced from said heat confining cavity region a distance substantially effecting a thermal isolation therefrom, said housing being positionable to locate said entrance opening to confront said gas flow to provide for passage of a local component of said gas through said passageway;

first temperature sensor means mounted within said heat confining cavity and including thermally stable first leads extending therefrom for providing signals corresponding with the temperature thereof;

heater means mounted within said heat confining cavity adjacent said first temperature sensor means for elevating the temperature thereof above said given temperature and having thermally stable power input leads extending from said housing, said heater means being positioned within said cavity and said cavity cross-sectional dimension being selected to substantially reduce radiant heat loss, conductive heat loss and convective loss of heat generated thereby; and second temperature sensor means mounted within said reference region and including thermally stable second leads extending from said housing for providing reference signals corresponding with said gas passing thereover.

18. The apparatus of claim 17 in which said heater means is formed as a thermally stable wire coil wound about said external surface of said first thermally stable tube at said heat confining cavity region.

19. The apparatus of claim 17 including:

support mount means coupled to said housing and having a first ceramic lead retainer extending to said support tube and communicating with said support tube passage for receiving said first leads, and a second ceramic lead retainer extending to said support tube and communicating with said support tube passage for receiving said second leads.

20. Apparatus for measuring the flow of gas of given high temperature comprising:

a housing formed of material which is structurally stable thermally insulating, and having a gas flow passageway therethrough along an axis thereof extending from an entrance opening to an exit opening, having a heat confining cavity region of predetermined cross-sectional dimension and length extending inwardly from said exit opening, said passageway having a reference region extending inwardly from said entrance opening and spaced from said heat confining cavity region a distance substantially effecting a thermal isolation therefrom, said housing being positionable to locate said entrance opening to confront said gas flow to provide for passage of a local component of said gas through said passageway;

first temperature sensor means mounted within said heat confining cavity and including thermally stable first leads extending therefrom for providing signals corresponding with the temperature thereof;

heater means mounted within said heat confining cavity adjacent said first temperature sensor means for elevating the temperature thereof above said given temperature and having thermally stable power input leads extending from said housing, said heater means being positioned within said cavity and said cavity cross-sectional dimension being selected to substantially reduce radiant heat loss, conductive heat loss and convective loss of heat generated thereby;

second temperature sensor means mounted within said reference region and including thermally stable second leads extending from said housing for providing reference signals corresponding with said gas passing thereover;

a first thermally stable tube having an external surface adjacent said housing and an internal surface defining said passageway;

a second thermally stable support tube positioned centrally of said first tube and having an internally disposed passage for retaining said first and second temperature sensor means in spaced relationship; and a ceramic seal for sealing said internally disposed passage.

* * * * *